D. R. PRATT.
Nut-Locks.

No. 156,235.  Patented Oct. 27, 1874.

WITNESSES  
INVENTOR  
Daniel R. Pratt  
By B. F. James, his Attorney

UNITED STATES PATENT OFFICE.

DANIEL R. PRATT, OF BROOKLYN, NEW YORK.

IMPROVEMENT IN NUT-LOCKS.

Specification forming part of Letters Patent No. 156,235, dated October 27, 1874; application filed August 8, 1874.

*To all whom it may concern:*

Be it known that I, DANIEL R. PRATT, of the city and State of New York, have invented a new and useful Improvement in what I denominate a "Raised Follower and Spring-Washer;" and I do hereby declare the following to be a true and correct description of the construction and operation of the same, reference being had to the annexed drawings, making part and parcel of this my specification.

The nature of my invention consists in the peculiar construction of the follower, having upon it projections that extend above it and the cup, so that the nut will not interfere or come in contact with the lugs that secure the follower to the cup, the nut-bearing surface being recessed to reduce friction.

The cup has formed upon its bottom side two or more lugs, that may be secured in any suitable manner to the object upon which it is desired to apply this device, to prevent the same from turning. The cup has two or more grooves or depressions in its sides corresponding with, and intended to receive, two or more lugs or projections formed upon the follower, and ears are formed upon the upper rim or side of the cup to be bent upon, the lugs or projections of the follower fitting into the grooves of the cup, thereby securing and holding firmly the cup and follower together. By this mode of securing the follower and the cup or spring holder together, the follower will not be moved or turned when the nut is screwed upon the bolt.

Figure 1:
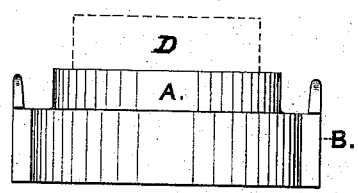
Figure 2:
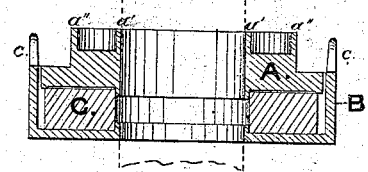
Figure 3:
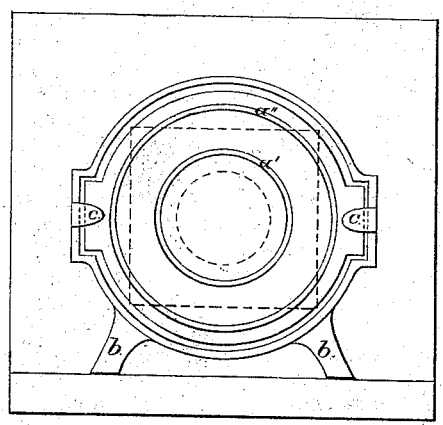

In the drawings, Figure 1 is a front view, showing the cup and follower, the dotted lines indicating the nut. Fig. 2 is a cross-section through the center of Fig. 1; and Fig. 3 is a top view, showing the concentric flanges on the upper side of the follower, and lugs formed upon the cup or spring-holder.

In the drawings, A represents the follower, having formed upon it two concentric flanges upon its upper surface, as seen at $a'$ $a''$. This furnishes a follower of much less weight of metal, and reduces the friction of the nut when screwed down upon it, and being so high above the bottom of the follower on account of the flanges $a'$ $a''$, the nut can never come in contact with the cup B and its ears $c$. B is the cup, having within it the spring C, upon which spring, either of rubber or metal, the follower A rests. The follower is held in position by turning down upon its bottom the ears $c$ $c$, as seen in Fig. 3. D, Fig. 1, is the nut, and is also seen in dotted lines in Fig. 3. $b$ $b$ are lugs found upon one side of the bottom of the cup B to prevent the same from turning with the nut, and are secured in position by nails, spikes, or other device, against which the lugs may rest.

What I claim as my invention, and desire to secure by Letters Patent, is—

The combination of the cup B, having the lugs $b$ $b$ formed upon its under side, with the spring C and follower A, having formed upon its upper surface the concentric flanges $a'$ $a''$, in the manner and for the purpose herein described.

DANIEL R. PRATT.

Witnesses:
 JOS. T. K. PLANT,
 B. F. JAMES.